US007182301B1

(12) United States Patent
Oddsen, Jr. et al.

(10) Patent No.: US 7,182,301 B1
(45) Date of Patent: Feb. 27, 2007

(54) MOUNTING BRACKET FOR ELECTRONIC DEVICE HAVING DIMENSIONAL INSERTS

(75) Inventors: Odd N. Oddsen, Jr., Easton, PA (US); Howard M. Williams, Jr., Emmaus, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 10/623,749

(22) Filed: Jul. 21, 2003

(51) Int. Cl.
*A47F 5/00* (2006.01)
(52) U.S. Cl. .............. 248/122.1; 248/74.5; 248/276.1; 403/221
(58) Field of Classification Search ................. 24/459, 24/284; 403/221, 222; 248/122.1, 125.1, 248/74.5, 68.1, 276.1; 16/2.1; 174/42, 40 CC
See application file for complete search history.

(56) References Cited

U.S. PATENT DOCUMENTS

| | | | | |
|---|---|---|---|---|
| 2,355,742 A | * | 8/1944 | Morehouse | 248/68.1 |
| 2,795,770 A | * | 6/1957 | Toedtman | 439/886 |
| 4,527,426 A | * | 7/1985 | Lang | 73/158 |
| 4,821,382 A | * | 4/1989 | Puschkarski | 24/298 |
| 5,172,877 A | * | 12/1992 | Hattori et al. | 248/68.1 |
| 5,769,556 A | * | 6/1998 | Colley | 403/24 |
| 6,050,034 A | * | 4/2000 | Krinner | 52/155 |
| 6,409,134 B1 | | 6/2002 | Oddsen, Jr. | |
| 6,499,704 B2 | | 12/2002 | Oddsen, Jr. | |
| 6,505,988 B1 | | 1/2003 | Oddsen, Jr. | |
| 6,595,473 B2 | * | 7/2003 | Aoki et al. | 248/74.4 |

FOREIGN PATENT DOCUMENTS

GB         2080676 A    *  2/1982

* cited by examiner

*Primary Examiner*—Korie Chan
(74) *Attorney, Agent, or Firm*—Lerner, David, Littenberg, Krumholz & Mentlik, LLP

(57) ABSTRACT

A mounting bracket and insert for use in mounting mountable devices to a mounting pole including a first section and a second section, each of said first and second sections having a concave surface, each concave surface having at least a one longitudinally extended groove, the first and second sections being joinable to one another, with such joining forming a cylindrical area between the first and second sections, said cylindrical area formed by said concave surfaces, and at least a pair of inserts, each insert having a convex surface sized to fit within the concave surface of one of the two sections, the convex surface of each insert having at least one protrusion aligned along the longitudinal axis of the insert and shaped to fit into at least one groove of the concave surfaces of the sections is described.

21 Claims, 4 Drawing Sheets

MOUNTING BRACKET FOR ELECTRONIC DEVICE HAVING DIMENSIONAL INSERTS

BACKGROUND OF THE INVENTION

The present invention relates to brackets and inserts for coupling a mountable device to a mounting pole.

Mounting brackets are typically used to affix mountable devices to mounting poles. Conventionally, when a device, such as a video display, computer terminal, video camera, scoreboard, etc., must be visible from a distance or from a certain vantage point, it is mounted to a mounting pole. This allows the device to use less floor or desk space, and also allows the device to be raised to a higher position, thus allowing for greater visibility.

Usually, coupling a mountable device to a mounting pole requires the use of a mounting bracket. The mounting bracket conventionally attaches to the mounting pole at one end and to the mountable device at the opposite end. See U.S. Pat. No. 6,499,704.

While conventional mounting brackets function as designed, in order to get and maintain a tight grip on the mounting pole, a conventional mounting bracket is physically tightened about and in direct contact with the mounting pole. This direct contact between the mounting bracket and mounting pole often leads to scratching, stripping or deformation to either the mounting pole, mounting bracket or both. In addition, mounting brackets may also cause the gouging of a channel or deep scratch on the surface of the mounting pole. These channels or deep scratches further loosen the mounting bracket and ultimately may cause the bracket and/or mounting pole to need replacement, which also increases costs.

Additionally, over time, an originally tight mounting bracket-mounting pole interconnection may loosen, thereby allowing the mountable device to move from its preferred position.

While mounting brackets are typically made for use with a range of mounting pole sizes, these sizes are necessarily limited to a range of mounting pole sizes due to the size of the mounting bracket itself.

Although mounting brackets are available for purchase in numerous sizes, a change from one mounting pole diameter to another generally requires the purchase of a mounting bracket of a suitable size. It is thus expensive to change the size of a mounting bracket.

SUMMARY OF THE INVENTION

"Mountable device" as used herein means any device capable of being mounted to a mounting pole using a mounting bracket and insert. It specifically but not exclusively includes display devices, video and still cameras, scoreboards, computer keyboards, computer terminals, and the like.

"Display device" as used herein means any mechanical or electronic device having a visible display, and includes but is not limited to television displays, flat-screen displays, computer terminal displays, high-definition displays, liquid-crystal displays, light-emitting diode displays, and also includes screens upon which an image may be projected.

"Mountable device arm" as used herein means any appendage having at least two ends that serve to couple a display device to a mounting means.

A "mounting means" is any device or combination of devices used to affix a display device arm and display or mountable device.

A "mounting pole" as used herein refers to any member to which a mountable device can be coupled using a mounting bracket and insert in accordance with the present invention. It includes but is not limited to vertical members, whether extending from a floor or a ceiling, as well as horizontal or angled members.

"Monitor," "display device," and "display monitor" are used interchangeably herein.

Similarly, "mountable device" and "mountable device assembly" are also used interchangeably.

In accordance with one aspect of the present invention, the invention includes a mounting bracket including a first section and a second section, each having an inner surface, and at least one of the sections having a groove. The first and second sections are joinable to one another to form an area therebetween bound by the inner surfaces. Also included are at least one insert sized to fit within the area. The insert(s) have at least one protrusion adapted to fit into the groove of the sections.

Additionally, another aspect of the present invention includes the mounting bracket described above further including a mountable device attachment connected to the first or second section.

Also included are variations of the mounting bracket in which each of the inserts has an inner surface and an outer surface, forming a predetermined thickness therebetween.

Another aspect of the invention includes a mounting bracket as described above further including at least two flange members on each of the first and second sections. The flange members of one section are adapted to mate with the corresponding flange members of the other section.

In an aspect of the present invention, the flange members are joined with their corresponding flange members using a fastener. Also included is a mounting bracket as described above in which each section includes a groove.

Another aspect of the invention includes a mounting bracket for attachment to a mounting pole in which at least two sections each have a concave inner surface, and are joinable together with their respective concave inner surface facing one another to define an area having a cross-sectional shape. Each concave inner surface has at least one groove along a longitudinal axis of the sections. Also included is at least a pair of inserts, each having a concave outer surface and a concave inner surface. The inserts, when in assembled relationship, have concave outer surfaces defining a cross-sectional shape corresponding to the cross-sectional shape of the area. The concave inner surfaces of the inserts define a cross-sectional shape corresponding to a cross-sectional shape of the mounting pole. Each insert also has at least one protrusion aligned along the longitudinal axis and adapted to fit within the groove of the sections. The concave inner surfaces of the sections are adapted to engage the mounting pole.

Another aspect of the invention includes the mounting bracket as described above wherein the inserts are composed of a pliable material.

Additionally, in another aspect, the mounting bracket as described above also includes at least two flanged members associated with each of the sections adapted for joining the sections.

Another aspect of the invention includes an insert for a mounting bracket having a shaped opening. The insert has an outer surface sized and shaped to fit within the opening of the mounting bracket. The mounting bracket has at least one groove, and the insert has at least one protrusion adapted to fit within the groove of the mounting bracket. In an embodiment the inserts are composed of a pliable material.

Another aspect of the invention includes the insert as described above wherein the insert also includes an inner concave surface adapted to partially enclose a mounting pole. The insert material between the inner concave surface and the outer convex surface defines a predetermined thickness.

Another aspect of the invention includes an insert for a mounting bracket having a shaped opening. The insert has an outer surface sized to fit within the shaped opening of the mounting bracket.

Another aspect of the invention includes a pair of inserts for a mounting bracket, each insert having a generally semicylindrical shape, a longitudinal axis and an outer convex surface sized to fit within an inner concave surface of a mounting bracket. The inner concave surface of the mounting bracket has two or more grooves, and the outer convex surface of each of the inserts has at least one protrusion shaped and sized to fit at least one of the grooves of the inner concave surface of the mounting bracket.

Another aspect of the invention includes inserts as described above in which the inserts are flexibly attached along a linear edge parallel to the longitudinal axis. In an embodiment, the flexible attachment is a hinge comprised of a thin layer of insert material.

Another aspect of the present invention includes a kit for use in mounting a mountable device to a mounting pole. The kit includes a mounting bracket and one or more bracket inserts.

In another aspect of the invention, a kit for use in mounting a mountable device to a mounting pole is provided. The kit includes a mounting bracket comprising a first section and a second section, each section having an inner concave surface, each inner concave surface having at least one groove. The first and second sections are joinable to one another, with such joining forming a cylindrical area between the sections. The cylindrical area is formed by the inner concave surfaces. Also included are at least a pair of inserts, each insert having an outer convex surface sized to fit within the inner concave surface of one of the at least two sections. The outer convex surface of each insert has at least one protrusion shaped and sized to fit into at least one groove of the inner concave surfaces of the sections. The inserts each also have an inner concave surface. The insert material between the convex surface and concave surface defines a predetermined thickness.

Additionally, another aspect of the invention includes the kit as described above, wherein multiple pairs of inserts are included. Each of the pairs of inserts has a convex surface identical to the convex surface of the other pairs, and each of the pairs of inserts has a predetermined thickness that varies from each of the other pairs.

Another aspect of the invention includes a kit for use with a mounting bracket in mounting a mountable device to a mounting pole. The kit includes at least a pair of inserts, each of which has an outer convex surface sized to fit within an inner concave surface of one of the sections. The outer convex surface of each insert also has at least one protrusion aligned along the longitudinal axis of the insert and shaped to fit into at least one groove of the inner concave surfaces of the sections. The inserts each also have an inner concave surface, with the material between the outer convex surface and the inner concave surface defining a thickness.

Another aspect of the invention includes the kit as described above, wherein multiple pairs of inserts are included. Each pair of the multiple pairs has an outer convex surface identical to the outer convex surface of all the other pairs of inserts, and each pair of inserts has a thickness varying from other pairs of the multiple pairs of inserts.

It is understood that both the foregoing general description and the following detailed description are exemplary and are intended to provide further explanation of the invention claimed.

BRIEF DESCRIPTION OF THE DRAWINGS

The accompanying drawings, which are incorporated in and constitute part of this specification, are included to illustrate and provide a further understanding of the bracket and insert of the invention. Together with the description, the drawings serve to explain the principles of the invention.

DETAILED DESCRIPTION

The present invention advantageously provides a mounting bracket and insert that together allow the secure coupling of a mountable device assembly to a mounting pole.

It also advantageously allows for the bracket to tightly grip the mounting pole without damage resulting to either the bracket or to the mounting pole. Instead, a generally less expensive insert is used between the bracket and the mounting pole to moderate the potential damage to the mounting pole or bracket, and to prevent slippage of either.

Additionally, due to the tight grip the bracket and insert can have on the mounting pole, the mountable device so mounted is securely in a fixed position and less likely to move due to slippage at the bracket/insert-mounting pole coupling.

The present invention also advantageously provides for a single bracket size to accommodate mounting poles of different diameter and geometry. When a bracket is overly large for the mounting pole in use, instead of changing brackets, the present invention allows the use of a thicker bracket insert, having a smaller inner diameter or geometry. Thus, the same size bracket may be used with a diverse assortment of sizes and shapes of mounting poles. Changing the bracket insert may be significantly less expensive than changing the bracket itself.

Figure 1:
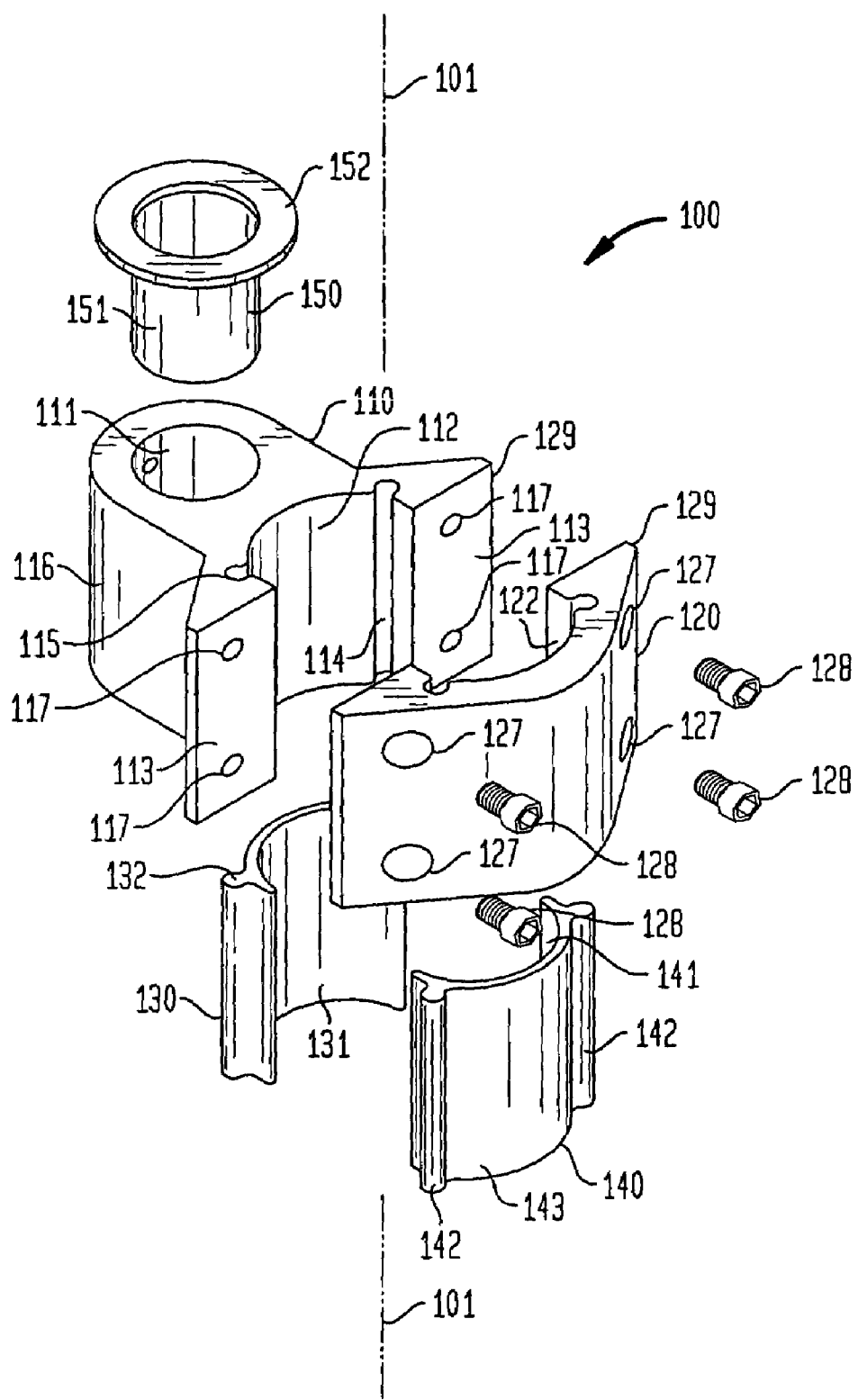
FIG. 1 is a perspective illustration of a mounting bracket and insert in unassembled relationship according to an embodiment of the present invention.

FIG. 1 illustrates a mounting bracket and insert assembly according to an embodiment of the present invention. In a preferred form, and as illustrated in FIG. 1, the mounting bracket and insert assembly 100 may be used to affix a mountable device (not depicted in FIG. 1) to a mounting pole (also not depicted in FIG. 1). In an embodiment, the mounting bracket may be formed by an aluminum extrusion process, although any material and method of production may alternatively be used.

Preferably, the mounting bracket comprises two unconnected sections, herein identified as bracket sections 110 and 120. The two bracket sections 110, 120 preferably mate to enclose a mounting pole between them. Alternatively, a bracket using a hinge to join the two sections, thereby allowing the enclosure of a mounting pole, may be used. Additionally, more than two bracket sections may be employed in a mounting bracket to form the enclosure around a mounting pole.

Regardless of the number of bracket sections 110, 120 used, at least one of the bracket sections 110 preferably includes a mountable device support area 116 adapted to support or attach to a mountable device. This mountable device support area 116 may be an integral part of the bracket section 110, or may be a separate unit attached with one or more fasteners (not depicted). The mountable device support area illustrated in FIG. 1 is exemplary of an integral mountable device support area.

The mountable device support area 116 depicted in FIG. 1 includes a cylindrical mounting bore 111 adapted to receive a bushing 150. The bushing 150 may optionally receive a rod for mounting a display device. FIG. 1 shows a bushing 150 having a cylindrical section 151 sized to be inserted into the cylindrical mounting bore 111. A lip 152 extends beyond the diameter of the cylindrical section 151 at the upper distal portion of the bushing 150 to prevent the bushing 150 from passing completely through the cylindrical mounting bore 111 under the weight of an attached mountable device (not depicted).

The bushing 150 may be used for rotationally attaching a mountable device to the mounting bracket. A mountable device can be attached to the cylindrical mounting bore 111 of the mounting bracket and insert 100 using other assemblies. Also, the mounting bore 111 does not necessarily need to be cylindrical, but may be of any shape or construction. The bushing 150 should be modified to accommodate the dimensions of the mounting bore 111. For example, if a mounting bore 111 with a rectangular cross-section is employed, the bushing 150 may include a section 151 with a rectangular, rather than a cylindrical cross-section. In such an embodiment, the bushing 150 may include a cylindrically bored inner area to provide a swivel capability to the attached display monitor, or the swivel capability would be provided at a locus other than the bushing 150-mounting bore 111 interface.

Similarly, the mountable device support area 116 of the bracket section 110 may support a mountable device using any of several alternative mechanisms. For example, the mountable device support area 116 may itself be an integral part of the frame of the mountable device. Alternatively, additional supporting structures (not depicted) may be attached to the mountable device support area 116, either removeably or permanently, with one or more display monitors attached thereto.

As previously mentioned, the mounting bracket preferably comprises two sections, herein identified as sections 110 and 120. The two bracket sections 110, 120 preferably mate so that their interior surfaces 112, 122 enclose bracket inserts 130, 140, which, in turn, enclose a mounting pole between them. Alternatively, when a different number of bracket sections are employed, their interior surfaces would preferably mate to enclose bracket inserts 130, 140, and a mounting pole. While the mounting pole is often cylindrical, it may be of any size or cross-sectional shape. The interior surfaces 112, 122 of the two bracket sections 110, 120 should preferably be adapted to approximate the size and cross-section of the mounting pole, also taking into account the size and shape of the bracket inserts 130, 140, which are disposed therebetween.

The two bracket sections 110, 120 preferably mate to each other using socket head capscrews 128 or other fasteners that allow adjustment of the mating tightness. A tightening of the fasteners preferably decreases the distance between the bracket sections 110, 120, thereby tightening the grip of the bracket on the bracket inserts 130, 140 and the mounting pole between the inserts 130, 140. The bracket sections 110, 120 illustrated in FIG. 1 include threaded holes 117 bored in flanged areas 113 of bracket section 110, which are in alignment with countersunk holes 127 bored in corresponding flanged areas (not depicted) of bracket section 120. Socket head capscrews 128 with head diameters greater than the countersunk holes 127 are passed through the countersunk holes 127 and the threaded holes 117, thereby mating the two bracket sections 110, 120 together.

Of course, other means of fastening the two bracket sections 110, 120 together may be used. For example, the two bracket sections 110, 120 may be hinged together along corresponding edges 129, with the holes and socket head capscrews or other threaded fasteners described above used only on the opposing flanged areas 113. Alternatively, other fasteners may be employed, such as threaded bolts. These other useable fasteners include but are not limited to: wingnuts, screws, latches, nut-bolt combinations, fastening pins, and equivalents thereof.

Preferably, and as illustrated in FIG. 1, the two bracket sections 110, 120 mate so that their inner concave surfaces 112, 122 enclose bracket inserts 130, 140, which, in turn, enclose a mounting pole between them. The inner concave surfaces 112, 122 of the bracket sections 110, 120 may also include one or more grooves 114 aligned in the same direction as the major axis of the mounting pole, also referred to herein as the "longitudinal axis" 101. The one or more grooves 114 on the inner concave surfaces 112, 122 of the bracket sections 110, 120 each correspond to longitudinal rib protrusions 132, 142 on the exterior faces 143 of the bracket inserts 130, 140. The rib protrusions 132, 142 are sized and positioned to allow the bracket inserts to be slid onto the inner concave surfaces 112, 122 of the bracket sections 110, 120, thereby mating the bracket inserts 130, 140 to the corresponding bracket sections 110, 120.

In a preferred embodiment, the grooves 114 on the inner concave surfaces 112, 122 of the bracket sections 110, 120 and their corresponding longitudinal rib protrusions 132, 142 on the exterior faces 143 of the bracket inserts 130, 140 have a cross-section 115 whereby the groves 114 and protrusions 132, 142 are narrower where they join to meet the inner concave surfaces 112, 122 of the bracket sections and exterior faces 143 of the bracket inserts, respectively, and wider in the more distal portions. This cross-section causes the joint between the bracket sections 110, 120 and bracket inserts 130, 140 to remain more securely in place, reducing the freedom of movement of the bracket inserts 130, 140 relative to the bracket sections 110, 120.

The bracket inserts 130, 140 also each have an inner concave surface 131. The inner concave surfaces 131 are directly in contact with a mounting pole in an embodiment. Although FIG. 1 depicts the inner concave surfaces 131 as smooth, as illustrated in FIG. 2 the inner concave surfaces 231, 241 may alternatively be ribbed. They may also have any manner of surface (e.g., ribbed, rough, dotted, dimpled, etc.), which serves to protect and grip the mounting pole.

The bracket inserts 130, 140 are preferably composed of a pliable material, such as plastic or rubber, most preferably a polyvinyl chloride ("PVC"). Some embodiments may alternatively use a material with less flexibility and more rigidity, such as vinyl or cardboard. Other materials may alternatively be employed.

Figure 2A:
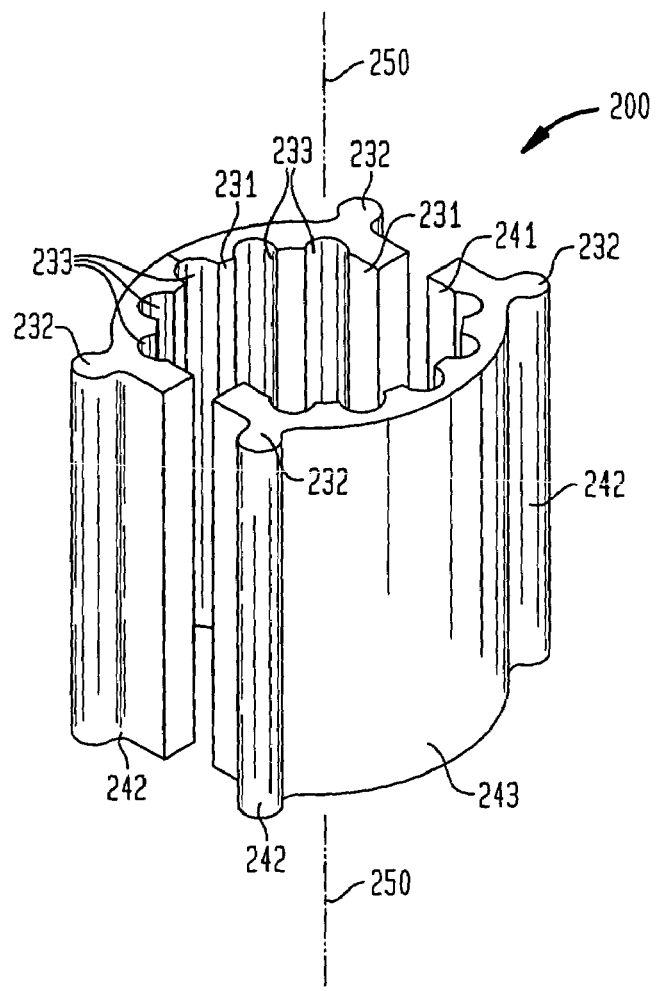
FIG. 2a is a perspective illustration of an insert according to an embodiment of the present invention.

FIG. 2a illustrates a pair of bracket inserts 200 in accordance with an embodiment of the present invention. The bracket inserts 200 have an exterior surface 243 having one or more raised protrusions 242. The raised protrusions 242 are preferably linear and aligned parallel to the major axis 250 of a cylinder formed by the pair of bracket inserts 200. The raised protrusions also have a cross-sectional shape 232 that allows insertion of the bracket inserts 200 into the grooves 114 of the inner concave surfaces 112, 122 of the two bracket sections 110, 120 (visible in FIG. 1). When the raised protrusions are inserted into the grooves 114 of the two bracket sections 110, 120, the groove-protrusion combination preferably serves a locking function, limiting movement of the inserts 200 relative to the bracket sections 110, 120.

Although the bracket inserts 200 depicted in FIG. 2a form semi-cylindrical pairs, it should be noted that the number and shape of the bracket inserts 200 may correspond to the number and shape of the bracket sections 110, 120. Thus, an embodiment using a single hinged bracket insert for a bracket using a single hinged bracket section, as well as an embodiment using more than two bracket inserts for a bracket using more than two bracket sections are envisioned.

The inner concave surface 231 of the bracket inserts 200 may be smooth or have three-dimensional texturing, such as the ribbing 233 illustrated in FIG. 2a. Texturing serves several desirable purposes. A textured inner concave surface 231 may cause less surface area of the bracket insert to actually contact or grip the mounting pole, thereby reducing the area of both exposed to potential damage. Also, extensive texturing such as that illustrated in FIG. 2a, when combined with use of a pliable material, such as some plastics, for the bracket inserts 200, can allow for a longer-lasting tightening of the bracket to the mounting pole due to the anti-deforming forces generated as the bracket is tightened and the ribbing deforms under pressure. If the bracket slightly loosens over time, these anti-deforming forces operate to maintain the pressure and gripping power of the bracket on the mounting pole. "Anti-deforming forces" as used herein means the tendency of a pliable material such as some plastics or rubber to return to their original non-deformed condition once deformed by pressure. Of course, these anti-deforming forces can be eliminated if the material is overly deformed or otherwise loses its structural integrity.

The use of a pliable material allows a tight grip of the mounting pole by the mounting bracket-insert combination without many of the disadvantages of prior mounting brackets. For example, the insert greatly reduces the damage to the mounting pole from the mounting bracket, such as scratching or stripping either the mounting pole or the mounting bracket. Most damage likely occurs to the relatively inexpensive insert.

Figure 2B:
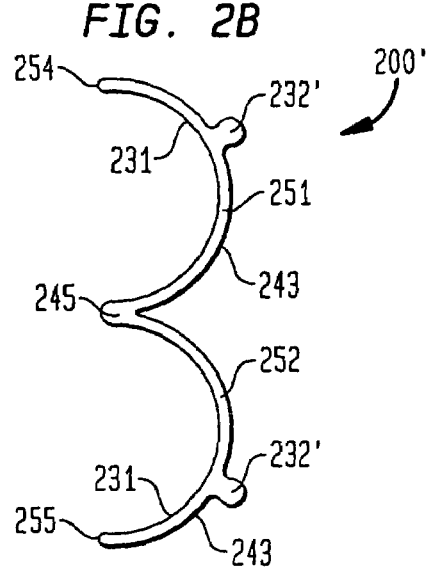
FIG. 2b is a top plan illustration of an insert according to an embodiment of the present invention.

FIG. 2b is a top plan illustration of an insert 200' according to one embodiment of the present invention. The insert 200' may be formed as a single unit having two or more insert portions 251, 252 connected by a hinging area 245. Each of the insert portions 251, 252 may have one or more raised protrusions 232'. The insert 200' has an outer surface 243 and an inner surface 231. In typical use, the inner surface 231 may surround a mounting pole (not depicted) by rotating ("closing") insert portions 251, 252 about hinging area 245. A hinging area 245 such as that depicted is known as a "living hinge." This rotation brings insert portion end 254 into a closer proximity with insert portion end 255, thereby encircling the mounting pole to a greater degree than in the un-rotated ("open") position. The mounting bracket may then be closed over the insert so that the inner surface of the bracket contacts the outer surface 243 of the insert, and the raised protrusions 232' are inserted into grooves on the bracket.

Although FIG. 2b depicts a single-unit insert 200' having two insert portions 251, 252, it is possible to fashion inserts having any number of insert portions. It is also possible that an insert may be used which has only a single unit, wherein the insert ends 254, 255 are connected, thereby forming a closed insert ring. This closed insert ring may then be slipped over a mounting pole and tightened into position by surrounding it with the mounting bracket.

Figure 2C:
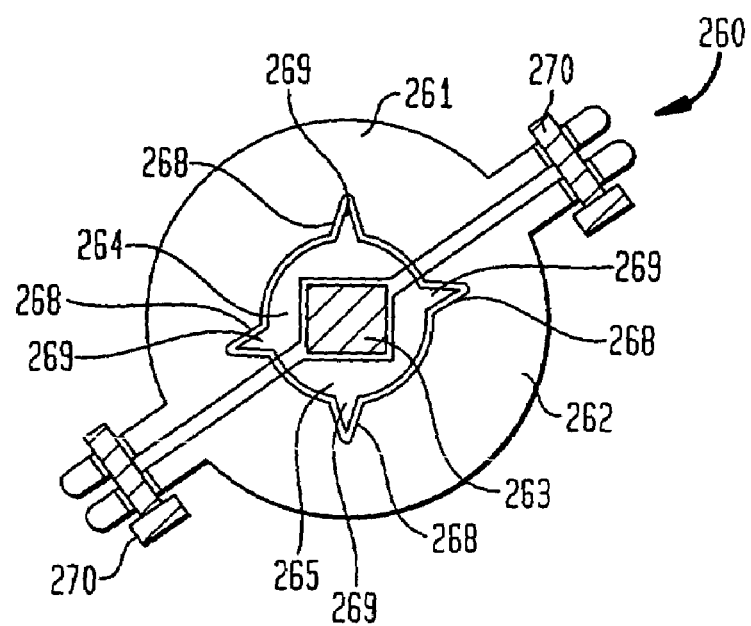
FIG. 2c is a top plan illustration of a mounting bracket and insert according to an embodiment of the present invention.

In another embodiment, as depicted in the top plan illustration of FIG. 2c, two mounting bracket sections 261, 262 and a pair of inserts 264, 265 are shown in assembled relationship about a mounting pole 263. A mounting pole 263 having a generally square cross section is surrounded by a pair of inserts 264, 265, which, when joined, form an inner region sized and shaped to surround the mounting pole 263. The outer surface region of the assembled inserts 264, 265 are sized and shaped to fit the generally round cross-sectioned inner region formed by the joined bracket sections 261, 262. The bracket sections 261, 262 also include grooves 268 into which protrusions 269 from the pair of inserts 264, 265 are sized and shaped to fit. The two mounting bracket sections 261, 262 may be fastened using fasteners 270. FIG. 2c depicts an embodiment using inserts 264, 265 to couple two mounting bracket sections 261, 262 having a generally circular inner cross section when joined with a mounting pole 263 having a generally square cross section.

Figure 2D:
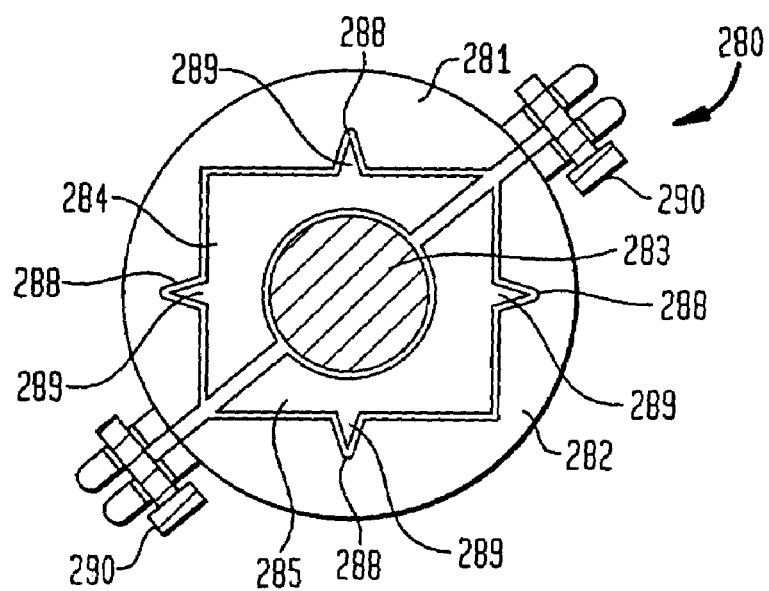
FIG. 2d is a top plan illustration of a mounting bracket and insert according to an embodiment of the present invention.

FIG. 2d is a top plan illustration of another embodiment in which two mounting bracket sections 281, 282 having a generally square inner cross section when joined, such as by fasteners 290, are coupled to a mounting pole 283 having a generally circular cross section. A pair of inserts 284, 285, which in assembled relation, form a generally circular inner cross section sized and shaped to surround the mounting pole 283, and having a generally square outer cross section sized and shaped to fit within the inner area of the joined mounting bracket sections 281, 282, is depicted. This embodiment preferably includes grooves 288 on the inner area of the mounting bracket sections 282, 282, and protrusions 289 from the inserts 284, 285 sized and shaped to fit the grooves 288.

Although embodiments of square and round cross sectional mounting poles and mounting bracket/insert assemblies are depicted in FIGS. 2c and 2d, it is understood that any combination of mounting bracket, insert, mounting pole cross sectional geometry may be used.

An embodiment of the present invention includes a kit containing a plurality of bracket inserts. The kit preferably includes bracket inserts to accommodate a variety of different sized or shaped mounting poles. For example, each kit may include a collection of bracket inserts designed to fit a predetermined bracket size and shape and a variety of mounting pole sizes. In this example, the outer surfaces 243 of the bracket inserts included in the kit could be of the same dimensions so that all the inserts will accommodate one size of mounting bracket, while the thickness of the bracket inserts and their inner surfaces 231, 241 are sized to provide coupling of different sizes or shapes of mounting poles.

In another embodiment of the present invention, a kit containing a plurality of bracket inserts and at least one bracket for use with the bracket inserts is provided.

Figure 3:
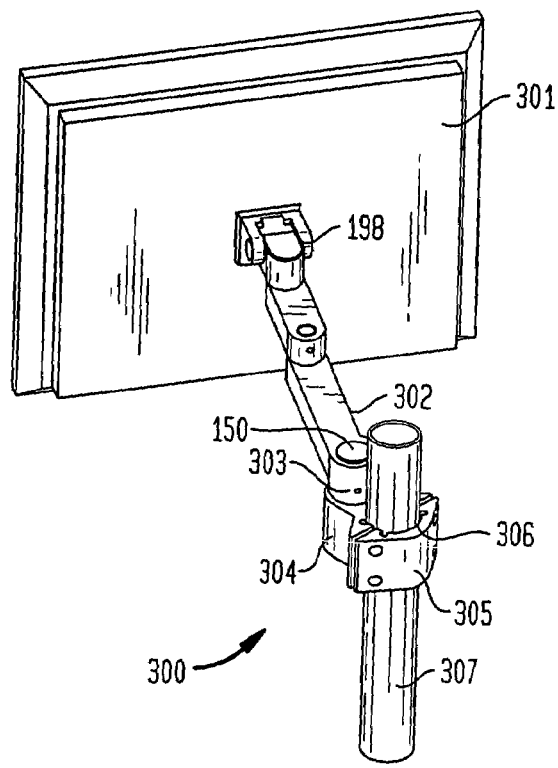
FIG. 3 is a perspective illustration of a mounting bracket and insert in use for mounting a display device to a mounting pole in accordance with an embodiment of the present invention.

FIG. 3 illustrates an embodiment of the mounting bracket and insert in use for holding a mountable device. A mountable device 301 is attached to a mountable device arm 302 by a tilter assembly 198 at one end, while the other end of the mountable device arm 303 is then inserted into a bushing 150. As described above, the mountable device swivel adapter is seated in bracket section 304, which is fastened to bracket section 305. Bracket inserts 306, only slightly visible in this view, lay between the bracket sections 304, 305 and the mounting pole 307. A mountable device arm 302 and tilter assembly 198 are known from U.S. Pat. Nos. 6,505,988 and 6,409,134.

Although the mounting pole 307 is depicted as oriented vertically, a horizontal or diagonal mounting pole 307 may be used in the alternative. If a horizontal or diagonal mounting pole is used, bracket section 304 may be adapted to usably connect with the mountable device arm 303. This could entail, for example, use of a bracket section 304 having a twist between the interior surface 112 area of the bracket section 304 and the bushing 150-mounting bore 111 interface area of the bracket section, or by other means.

Figure 4:
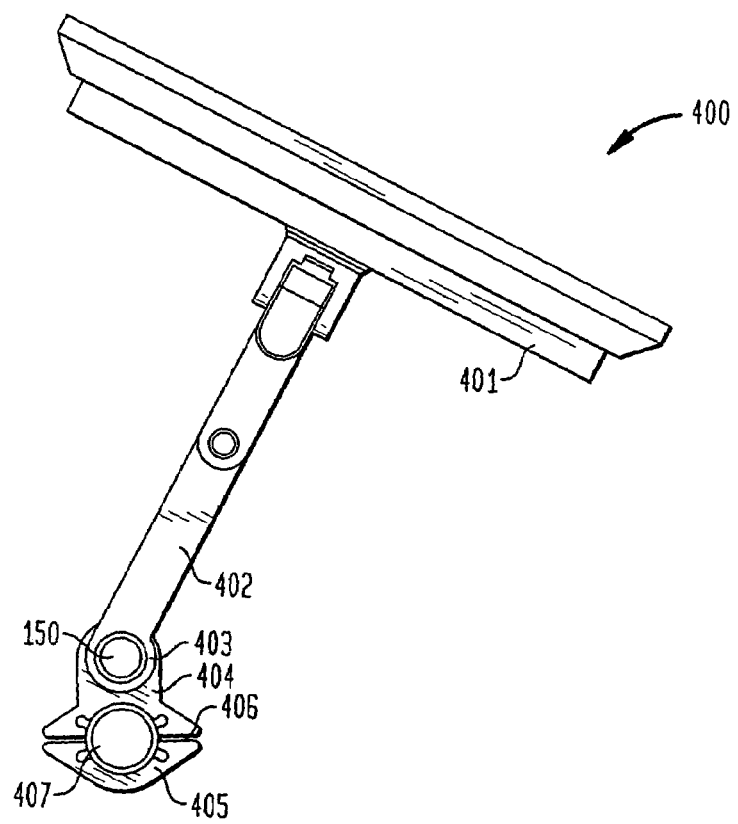
FIG. 4 is a top plan illustration of a mounting bracket and insert in use for mounting a display device to a mounting pole in accordance with an embodiment of the present invention.

FIG. 4 illustrates a top-down view of a mounting bracket and insert in use for mounting a mountable device to a mounting pole in accordance with an embodiment of the present invention. Again, the mountable device 401 is coupled to a mountable device arm 402 at one end of the mountable device arm 402, while the other end 403 of the mountable device arm 402 is then inserted into a bushing 150. As described above, the bushing 150 is seated in bracket section 404, which is fastened to bracket section 405. Bracket inserts 406 are visible in profile and lay between the bracket sections 404, 405 and the mounting pole 407.

It will be understood that the above-described arrangements of apparatus and the method thereof are merely illustrative of applications of the principles of this invention and many other embodiments and modifications may be made without departing from the spirit and scope of the invention as defined in the claims.

Although the invention herein has been described with reference to particular embodiments, it is to be understood that these embodiments are merely illustrative of the principles and applications of the present invention. It will be apparent to those skilled in the art that various modifications and variations can be made in the apparatus and methods of the present invention without departing from the spirit and scope of the invention. Thus, it is intended that the present invention include modifications and variations that are within the scope of the appended claims and their equivalents.

The invention claimed is:

1. A mounting kit for mounting a mountable device to a mounting support having an exterior surface comprising:
   a mounting bracket having a first section and a second section, each of said first and second sections having an inner surface, at least one of said sections having a groove, said first and second sections being joinable to one another to form an area therebetween, said area bound by said inner surfaces; and
   at least two interchangeable curved inserts each sized to fit within said area, each of said inserts including a pair of insert halves mateable with one another to form one of said inserts, said inserts having a thickness and at least one protrusion adapted to fit into said groove of at least one of said sections, said inserts having the same outside diameter and different inside diameter defined by a curved inner surface and a curved outer surface of said inserts, whereby the radial distance between said curved inner and outer surfaces is different for each of said inserts, said curved inner surface of each of said inserts adapted to directly and substantially contact said exterior surface of said mounting support.

2. The mounting kit according to claim 1, said mounting bracket further comprising a mountable device attachment connected to one of said first section and said second section.

3. The mounting kit according to claim 1, said mounting bracket further comprising at least two flange members on each of said first and second sections, said flange members of said first section adapted to mate with corresponding said flange members of said second section.

4. The mounting kit according to claim 1, further comprising a plurality of grooves on said inner surface of said at least one insert.

5. The mounting kit according to claim 3, wherein said first and second sections of said bracket are mated at said flange members using one or more fasteners.

6. The mounting kit according to claim 1, wherein each of said first and second sections of said bracket includes a groove.

7. A mounting kit for attachment to a mounting pole having an exterior surface comprising:
   a mounting bracket having at least two sections, each of said sections having a concave inner surface, said sections joinable together with their respective concave inner surface facing one another to define an area having a cross-sectional shape, each concave inner surface having at least one groove along a longitudinal axis of said sections; and
   at least a pair of interchangeable inserts, each of said inserts having a convex outer surface and a concave inner surface, each of said inserts including a pair of insert halves mateable with one another to form one of said inserts, said convex outer surfaces of said inserts defining a cross-sectional shape corresponding to the cross-sectional shape of said area and said concave inner surfaces of said inserts defining a cross-sectional shape corresponding to a cross-sectional shape of said mounting pole, each of said inserts having a thickness and at least one protrusion aligned along the longitudinal axis of said inserts and adapted to fit within said at least one groove of said sections, wherein said concave inner surfaces of each of said inserts is adapted to directly and substantially contact said exterior surface of said mounting pole, said inserts having the same outside diameter and different inside diameter defined by said convex outer surface and said concave inner surface, whereby the radial distance between said convex outer surface and said concave inner surface is different for each of said inserts.

8. The mounting kit according to claim 7, said mounting bracket further comprising at least two flanged members associated with each of said sections adapted for joining said sections.

9. The mounting bracket according to claim 7, further comprising a plurality of rib-like protrusions aligned along said longitudinal axis of said concave inner surface of said inserts.

10. The mounting bracket according to claim 7, further comprising a plurality of protrusions aligned along said longitudinal axis of said concave inner surface of said inserts.

11. An insert kit for a mounting bracket for mounting a mountable device to a mounting support having an exterior surface comprising, a pair of interchangeable inserts, said inserts having a generally cylindrical shape, each of said inserts including a pair of insert halves mateable with one another to form one of said inserts, each of said inserts having a longitudinal axis and an outer convex surface sized to fit within an inner concave surface of a mounting bracket, said inner concave surface of said mounting bracket having two or more grooves, each of said inserts having a thickness and at least one protrusion shaped and sized to fit within one of said grooves of said mounting bracket, said inserts having the same outside diameter and different inside diameter defined by said outer convex surface and an inner surface of said inserts, whereby the radial distance between said outer convex surface and said inner surface is different for each of said inserts, said inner surface of each of said inserts adapted to directly and substantially contact said exterior surface of said mountable support.

12. The pair of inserts according to claim 11, wherein the inserts are flexibly attached along a linear edge parallel to said longitudinal axis.

13. The pair of inserts according to claim 12, wherein said inserts are comprised of an insert material and are flexibly attached along said linear edge using a hinge comprised of a thin layer of said insert material.

14. A kit for use in mounting a mountable device to a mounting support having an exterior surface, said kit comprising:
   a mounting bracket having an inner surface and an opening, said opening bounded by said inner surface, said inner surface having at least one groove; and
   at least two interchangeable bracket inserts adapted to be received within said opening, each of said inserts including a pair of insert halves mateable with one another to form one of said inserts, said inserts each having an inner surface and an outer surface forming a predetermined thickness therebetween, said outer surface of each insert having a predetermined dimension and at least one protrusion adapted to be received within said at least one groove, said thickness of each said insert varying from said thickness of the other of said inserts, said predetermined dimension of each of said inserts being the same whereby said inserts are adaptable to be received with said opening having their outer surface in direct contact with said mounting bracket and their inner surface directly and substantially in contact with said exterior surface of said mounting support.

15. The insert according to claim 14, further comprising a plurality of rib-like protrusions along said inner surface of said inserts.

16. A kit for use in mounting a mountable device to a mounting support having an exterior surface, said kit comprising:
   a mounting bracket having an inner surface and an opening, said opening bounded by said inner surface, said inner surface having at least one groove; and
   at least two interchangeable bracket inserts adapted to be received within said opening, each of said inserts including a pair of insert halves mateable with one another to form one of said inserts, said inserts having an inner surface and an outer surface, said outer surface of each insert having a predetermined outer dimension and at least one protrusion adapted to be received within said at least one groove, said outer surface of each of said inserts being identical to each other in said outer dimension, said inner surface of each of said inserts having an inner dimension varying from said inner dimensions of the other of said inserts, whereby said inserts are adaptable to be received with said opening having their outer surface in direct contact with said mounting bracket and their inner surface directly and substantially in contact with said exterior surface of said mounting support.

17. A kit for use in mounting a mountable device to a mounting pole having an exterior surface, said kit comprising:
   a mounting bracket comprising a first section and a second section, each of said first and second sections having an inner concave surface, at least one of said inner concave surfaces of said sections having at least one groove, said first and second sections being joinable to one another forming an area between said inner concave surfaces; and
   at least a pair of interchangeable inserts, each of said inserts including a pair of insert halves mateable with one another to form one of said inserts, each of said inserts having an inner concave surface and an outer convex surface, said outer convex surface having at least one protrusion adapted to be received within said at least one groove, said outer convex surface of each of said inserts sized to fit within said area in contact with said inner concave surface of said sections when joined together, said inserts each having a different thickness between their said outer and inner surfaces.

18. A kit for use in mounting a mountable device to a mounting pole having an exterior surface, said kit comprising:
   a mounting bracket comprising a first section and a second section, each of said first and second sections having an inner concave surface, at least one of said inner concave surfaces having a groove, said first and second sections being joinable to one another forming an area between said inner concave surfaces; and
   at least a pair of interchangeable inserts, each of said inserts including a pair of insert halves mateable with one another to form one of said inserts, each of said inserts having an inner surface and an outer convex surface, said outer convex surfaces of said inserts having at least one protrusion adapted to be received within said at least one groove, said outer convex surface of said inserts sized to fit within said area in contact with said inner concave surface of said sections when joined together, said inner surface of each said inserts having dimensions varying from the other of said inserts, said inner surface of each of said inserts adapted to directly and substantially engage said exterior surface of said mounting pole.

19. The kit in accordance with claim 18, wherein said inner surfaces of said inserts are concave, and aid outer convex surface and said inner surface define a thickness, said thickness being different for each of said pair of inserts.

20. A kit for use with a mounting bracket having an inner concave surface with at least one groove in mounting a mountable device to a mounting pole having an exterior surface, said kit comprising:
   a plurality of interchangeable inserts, each of said inserts including a pair of insert halves mateable with one another to form one of said inserts, each of said inserts having an outer convex surface dimensioned to fit in contact with said inner concave surface of said mounting bracket, said outer convex surface of each insert having at least one protrusion aligned along the longitudinal axis of the insert and shaped to fit into said groove of said inner concave surface of said mounting bracket, said inserts each also having an inner concave surface, said inserts forming a thickness between said inner and outer surfaces differing from each other, said inner concave surface of each of said inserts adapted to directly and substantially engage said exterior surface of said mounting pole.

21. The kit according to claim 20, wherein each of said inserts has said outer convex surface identical to the outer convex surface of all the other of said inserts.

* * * * *

UNITED STATES PATENT AND TRADEMARK OFFICE
CERTIFICATE OF CORRECTION

| | | |
|---|---|---|
| PATENT NO. | : 7,182,301 B1 | Page 1 of 1 |
| APPLICATION NO. | : 10/623749 | |
| DATED | : February 27, 2007 | |
| INVENTOR(S) | : Odd N. Oddsen, Jr. and Howard M. Williams, Jr. | |

It is certified that error appears in the above-identified patent and that said Letters Patent is hereby corrected as shown below:

At Column 12, line 58, "aid" should read -- said --.

Signed and Sealed this

First Day of April, 2008

JON W. DUDAS
*Director of the United States Patent and Trademark Office*